United States Patent
Benhase et al.

(10) Patent No.: US 7,991,972 B2
(45) Date of Patent: Aug. 2, 2011

(54) DETERMINING WHETHER TO USE A FULL VOLUME OR REPOSITORY FOR A LOGICAL COPY BACKUP SPACE

(75) Inventors: Michael Thomas Benhase, Tucson, AZ (US); Shachar Fienblit, Ein Ayala (IL); Yu-Cheng Hsu, Tucson, AZ (US); Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 11/952,021

(22) Filed: Dec. 6, 2007

(65) Prior Publication Data
US 2009/0150626 A1    Jun. 11, 2009

(51) Int. Cl.
G06F 12/00 (2006.01)
G06F 13/00 (2006.01)
G06F 13/28 (2006.01)

(52) U.S. Cl. .................... 711/162; 711/E12.002
(58) Field of Classification Search .................. None
See application file for complete search history.

(56) References Cited

U.S. PATENT DOCUMENTS

| | | | |
|---|---|---|---|
| 5,960,460 A * | 9/1999 | Marasco et al. | 711/162 |
| 6,526,484 B1 * | 2/2003 | Stacovsky et al. | 711/158 |
| 6,766,416 B2 | 7/2004 | Bachmat | |
| 6,912,629 B1 * | 6/2005 | West et al. | 711/161 |
| 6,970,973 B2 | 11/2005 | Katsuragi et al. | |
| 7,139,851 B2 * | 11/2006 | Fujibayashi | 710/58 |
| 7,257,689 B1 | 8/2007 | Baird | |
| 7,484,119 B2 * | 1/2009 | Fisher et al. | 714/15 |
| 2002/0107877 A1 * | 8/2002 | Whiting et al. | 707/204 |
| 2005/0097132 A1 * | 5/2005 | Cochran et al. | 707/104.1 |

(Continued)

FOREIGN PATENT DOCUMENTS

WO    2007093490    8/2007

OTHER PUBLICATIONS

International Search Report and Written Opinion dated Mar. 26, 2009 for Application No. PCT/EP2008/066695 filed Dec. 3, 2008.

(Continued)

*Primary Examiner* — Matt Kim
*Assistant Examiner* — Matthew R Chrzanowski
(74) *Attorney, Agent, or Firm* — David W. Victor; Konrad Rayens & Victor LLP (57) ABSTRACT

Provided are a method, system, and article of manufacture for determining whether to use a full volume or repository for a logical copy backup space. A determination is made of a source volume to backup using a logical copy operation. The logical copy operation is completed upon indicating the source volume data to backup. During a logical copy duration, point-in-time data in the source volume as of a point-in-time when the logical copy was established is copied to a backup space in response to receiving an update to the point-in-time data. A history of writes to the source volume is processed to determine whether to allocate a full target volume as the backup space providing a corresponding data unit for each data unit in the source volume or allocate a repository as the backup space, wherein the repository uses less storage space than the full target volume. The logical copy operation using the determined full target volume or repository as the backup space is initiated.

26 Claims, 6 Drawing Sheets

U.S. PATENT DOCUMENTS

| | | | |
|---|---|---|---|
| 2006/0047931 A1* | 3/2006 | Saika | 711/162 |
| 2006/0117221 A1* | 6/2006 | Fisher et al. | 714/21 |
| 2006/0218364 A1 | 9/2006 | Kitamura | |
| 2006/0259724 A1* | 11/2006 | Saika | 711/162 |
| 2007/0050573 A1* | 3/2007 | Arakawa et al. | 711/162 |
| 2007/0112883 A1 | 5/2007 | Asano et al. | |
| 2007/0136395 A1 | 6/2007 | Fries et al. | |
| 2007/0208910 A1* | 9/2007 | Koseki et al. | 711/114 |
| 2007/0226438 A1* | 9/2007 | Erofeev | 711/162 |
| 2008/0109630 A1* | 5/2008 | Watanabe et al. | 711/171 |
| 2008/0133456 A1* | 6/2008 | Richards et al. | 707/2 |
| 2008/0177963 A1* | 7/2008 | Rogers | 711/162 |
| 2008/0294859 A1* | 11/2008 | Nguyen | 711/162 |
| 2009/0077300 A1* | 3/2009 | Forbis et al. | 711/4 |
| 2009/0077328 A1* | 3/2009 | Arakawa et al. | 711/154 |

OTHER PUBLICATIONS

Response to the Article 19 communication dated Mar. 26, 2009 for Application No. PCT/EP2008/066695 filed Dec. 3, 2008.

* cited by examiner

FIG. 1

Volume Copy Relationship Information

DETERMINING WHETHER TO USE A FULL VOLUME OR REPOSITORY FOR A LOGICAL COPY BACKUP SPACE

BACKGROUND OF THE INVENTION

1. Field of the Invention

The present invention relates to a method, system, and program for determining whether to use a full volume or repository for a logical copy backup space 2. Description of the Related Art Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain data mirroring systems, a timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

One technique to provide a consistent point-in-time copy of data is to suspend all writes to the primary storage and then while writes are suspended copy all the data to mirror to the secondary storage or backup device. A disadvantage of this technique is that host writes are suspended for the time to create a point-in-time copy of data, which may adversely effect application processing at the host. An alternative technique is to establish a logical copy of data at the primary storage target, which takes a very short period of time, such as no more than a second or two. Thus, suspending host writes to the primary storage during the time to establish the logical copy is far less disruptive to host application processing than would occur if host writes were suspended for the time to copy all the source data to the target volume. After establishing the logical copy, source volume data subject to an update is copied to a target volume so that the target volume has the data as of the point-in-time the logical copy was established, before the update. This defers the physical copying until an update is received. This logical copy operation is performed to minimize the time during which the target and source volumes are inaccessible. The point-in-time copy comprises the combination of the data in the source volume and the updates One such logical copy operation is known as FlashCopy® (FlashCopy is a registered trademark of International Business Machines, Corp. or "IBM"). FlashCopy® involves establishing a logical point-in-time copy relationship between primary and secondary volumes on different devices. Once the logical relationship is established, hosts may then have immediate access to data on the primary and secondary volumes, and the data may be copied as part of a background operation. The data is copied from the primary to the secondary volumes as part of a background operation. While the data is being copied over, reads to any tracks in the primary cache that have not been updated with the data from the primary storage causes the source track to be staged to the secondary cache before access is provided to the track from the secondary cache. Any reads of data on secondary tracks that have not been copied over cause the data to be copied over from the primary device to the secondary cache so that the secondary target has the copy from the source that existed at the point-in-time of the FlashCopy® operation. Further, any writes to tracks on the primary storage that have not been copied over cause the tracks on the primary storage to be copied to the secondary storage.

To perform the logical copy operation, an entire target volume may be allocated at the secondary storage to store updates to the primary volume, which requires that the same amount of storage space be allocated on the secondary storage for the target volume as is allocated in the primary storage for the source volume. To save space on the secondary storage space, certain space efficient logical copy techniques known in the art allocate a repository to store the updates to the source volume during the logical copy period, where the repository space is substantially less than the full volume size of the source volume because in many cases the data updated on the source volume during the logical copy duration that must be copied to the target is substantially less than the storage space of the full source volume.

There is a need in the art for continued improvements to take advantage of space efficient logical copy operations that utilize a repository less in size than the full source volume subject to the logical copy operation.

SUMMARY

Provided are a method, system, and article of manufacture for determining whether to use a full volume or repository for a logical copy backup space. A determination is made of a source volume to backup using a logical copy operation. The logical copy operation is completed upon indicating the source volume data to backup. During a logical copy duration, point-in-time data in the source volume as of a point-in-time when the logical copy was established is copied to a backup space in response to receiving an update to the pointin-time data. A history of writes to the source volume is processed to determine whether to allocate a full target volume as the backup space providing a corresponding data unit for each data unit in the source volume or allocate a repository as the backup space, wherein the repository uses less storage space than the full target volume. The logical copy operation using the determined full target volume or repository as the backup space is initiated.

In a further embodiment, during the logical copy duration, the point-in-time data in the source volume subject to the update is copied to corresponding locations in the target volume in response to allocating the full target volume. During the logical copy duration, the point-in-time data in the source volume subject to the update to the repository is copied and a repository index is updated to indicate locations in the repository of the point-in-time data copied from the source volume locations in response to allocating the repository.

In a further embodiment, the processing of the history of writes to the source volume to determine whether to allocate a full target volume or the repository as the backup space comprises estimating a percentage of the source volume receiving writes during the logical copy duration and determining whether the estimated percentage exceeds a threshold percentage. The full target volume is allocated as the backup space in response to determining that the estimated percentage exceeds the threshold percentage. The repository is allocated as the backup space in response to determining that the estimated percentage is less than the threshold percentage.

In a further embodiment, the estimated percentage comprises an estimated percentage of writes to a unique location in the source volume during the logical copy duration, not subsequent writes to a same location in the source volume.

In a further embodiment, the logical copy duration comprises an estimated time to write the target volume to a backup storage device.

In a further embodiment, the determining of the source volume to backup using a logical copy operation comprises determining a plurality of source volumes to backup using logical copy operations. The operation of processing the history of writes to the source volume to determine whether to allocate a full target volume or the repository as the backup space is performed independently for each of the source volumes.

In a further embodiment, the logical copy duration comprises for each source volume an estimated time to write the target volume to a backup storage device. The logical copy duration for each source volume includes the logical copy duration of target volumes previously written to the backup storage device and a time to write the target volume to the backup storage device. The operation of processing the history of writes to each source volume to determine whether to allocate a full target volume or the repository as the backup space is performed for each source volume and comprises performing for each source volume estimating a percentage of the source volume receiving writes during the logical copy duration for the source volume and determining whether the estimated percentage exceeds a threshold percentage. The full target volume is allocated as the backup space for the source volume in response to determining that the estimated percentage exceeds the threshold percentage. The repository is allocated as the backup space in response to determining that the estimated percentage is less than the threshold percentage.

In a further embodiment, a determination is made of a write rate for each source volume and the source volumes are ordered according to their write rates, from highest write rate to a lowest write rate. The target volumes are written to the backup storage device according to the ordering of their corresponding source volumes. The ordering determines an estimated logical copy duration for each source volume. The logical copy duration for each source volume comprises the estimated logical copy duration to write each previous target volume in the ordering of the corresponding source volumes to the backup storage device plus the logical copy duration to write the target volume being considered to the backup storage.

In a further embodiment, the logical copy duration for each source volume comprises a time to create a consistency group across all the source volumes.

DETAILED DESCRIPTION

Figure 1:
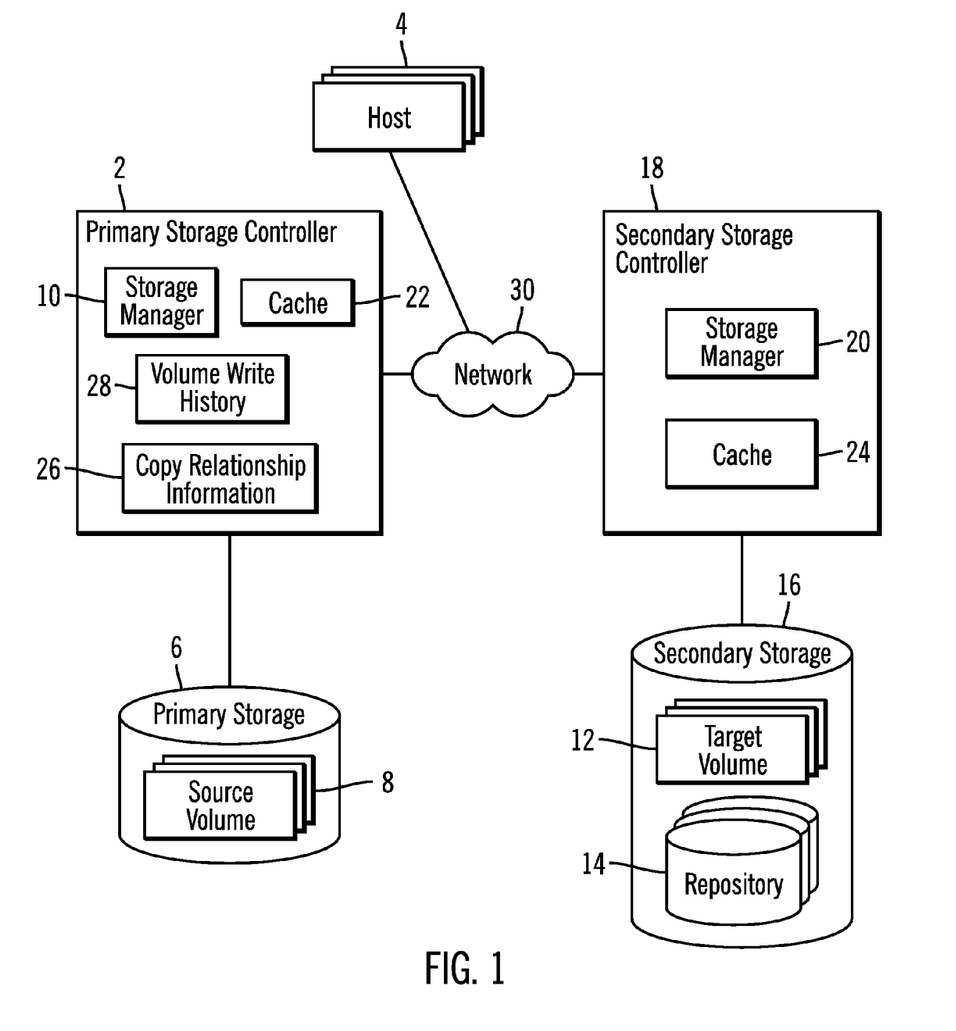
FIGS. 1 and 4 illustrate embodiments of a computing environment.

FIG. 1 illustrates an embodiment of a network computing environment. A primary storage controller 2 manages Input/Output (I/O) requests from one or more host systems 4 to a primary storage 6 in which storage volumes 8, referred to as source volumes 8, are configured. The primary storage controller 2 includes a storage manager 10 program that manages I/O requests to the primary storage volumes 8 and may maintain copy relationships for source volumes 8, such that updates to source volumes 8 in a copy relationship are copied to target volumes 12 or repositories 14 in a secondary storage 16. A secondary storage controller 18 includes a storage manager 20 program to manage I/O access to the secondary storage 16.

The primary 2 and secondary 18 storage controllers include a cache 22 and 24, respectively, to buffer read and write data to their corresponding storage 6 and 16. Both the primary 2 and secondary 18 storage controllers may receive read and write requests from host systems 4.

The primary storage manager 10 may maintain copy relationship information 26 having information on source volumes 6 in a logical copy relationship. The primary storage manager 10 further maintains volume write history 28 information for each source volume 6 indicating a write rate, such as a data quantity per unit of time, e.g., megabytes (Mb) per second. In certain embodiments, the write rate may comprise the rate of writes to unique storage locations during a logical copy operation, which would not include writes to the same location previously written.

In one embodiment, the copy operation between the primary 2 and secondary 18 storage controllers may comprise a mirror relationship and then a further logical copy relationship may be made of the target volumes 12 at the secondary storage 16 to provide consistent data at the secondary site.

The primary 2 and secondary 18 storage controllers and host 4 may communicate over a network 30. The network 30 may comprise a Storage Area Network (SAN), Local Area Network (LAN), Intranet, the Internet, Wide Area Network (WAN), peer-to-peer network, wireless network, arbitrated loop network, etc. The storages 6 and 16 may each comprise an array of storage devices, such as a Just a Bunch of Disks (JBOD), Direct Access Storage Device (DASD), Redundant Array of Independent Disks (RAID) array, virtualization device, tape storage, flash memory, etc.

In certain embodiments, volumes 8 and 12 in the storage systems 6 and 16 maintained by a storage controller 2 and 18, respectively, may be assigned to one or more sessions. Volumes may be organized in a logical subsystem (LSS), and the volumes in a LSS maintained by a primary storage controller 2 may be assigned to a session.

Figure 2:
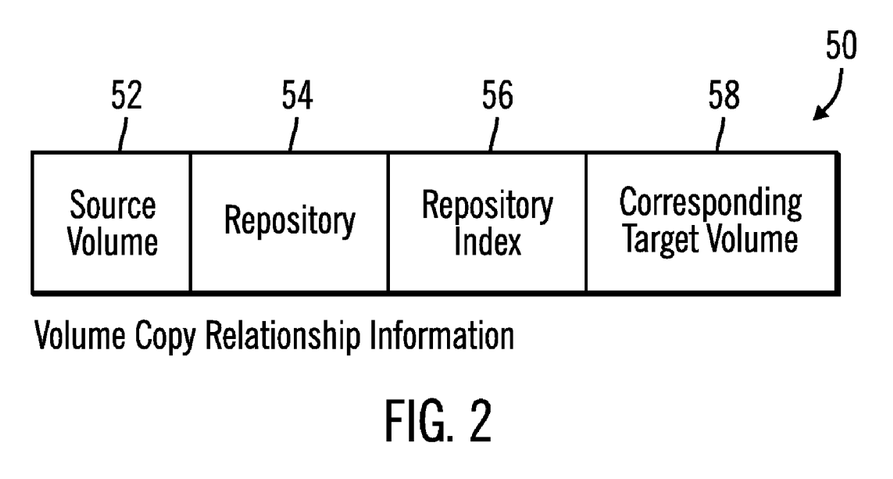
FIG. 2 illustrates an embodiment of volume copy relationship information.

FIG. 2 illustrates an embodiment of volume copy relationship information 50 maintained for one source volume 6 in a logical copy relationship, such as a FlashCopy® relationship. The copy relationship information 26 includes volume copy relationship information 50 for each source volume 8 in a logical copy relationship with a corresponding target volume 12. In a logical copy relationship, the copy relationship is established by creating copy relationship information, such as information 50 and a volume bitmap including a bit for each track in the source volume 8, where each bit indicates whether a track has been updated and the point-in-time data copied to the secondary storage 16, which comprises the source volume data before being updated, as of the point-in-time the logical copy relationship was established. Any source volume 8 point-in-time data subject to an update is copied to a corresponding target volume 12 if a full target volume 12 is allocated as the backup space to store point-in-time data subject to an update or a target repository 14 if less than a full volume is allocated as the backup space for the source volume 8.

The volume copy relationship information 50 indicates the source volume 52 subject to the copy relationship. If space efficient logical copy is used, which means less than a full volume is allocated on the secondary storage 16 to store the point-in-time data subject to an update in the source volume 8, then a repository field 54 identifies a repository 14 in the secondary storage 12 and a repository index 56 indicates the location where the copied point-in-time data from the source volume 52, e.g., a track or other data unit, is stored in the identified repository 54. If a full target volume is used to store the point-in-time data that is updated, then the repository fields 54 and 56 are null and a corresponding target volume field 58 indicates a target volume 12 allocated as the backup space to store data subject to an update in the source volume 8 during the logical copy duration. With the described embodiments, source volumes 6 in logical copy relationships may use either a repository or full volume as the backup space, where different source volumes may have different types of backup space, e.g., repository or full volume.

Figure 3:
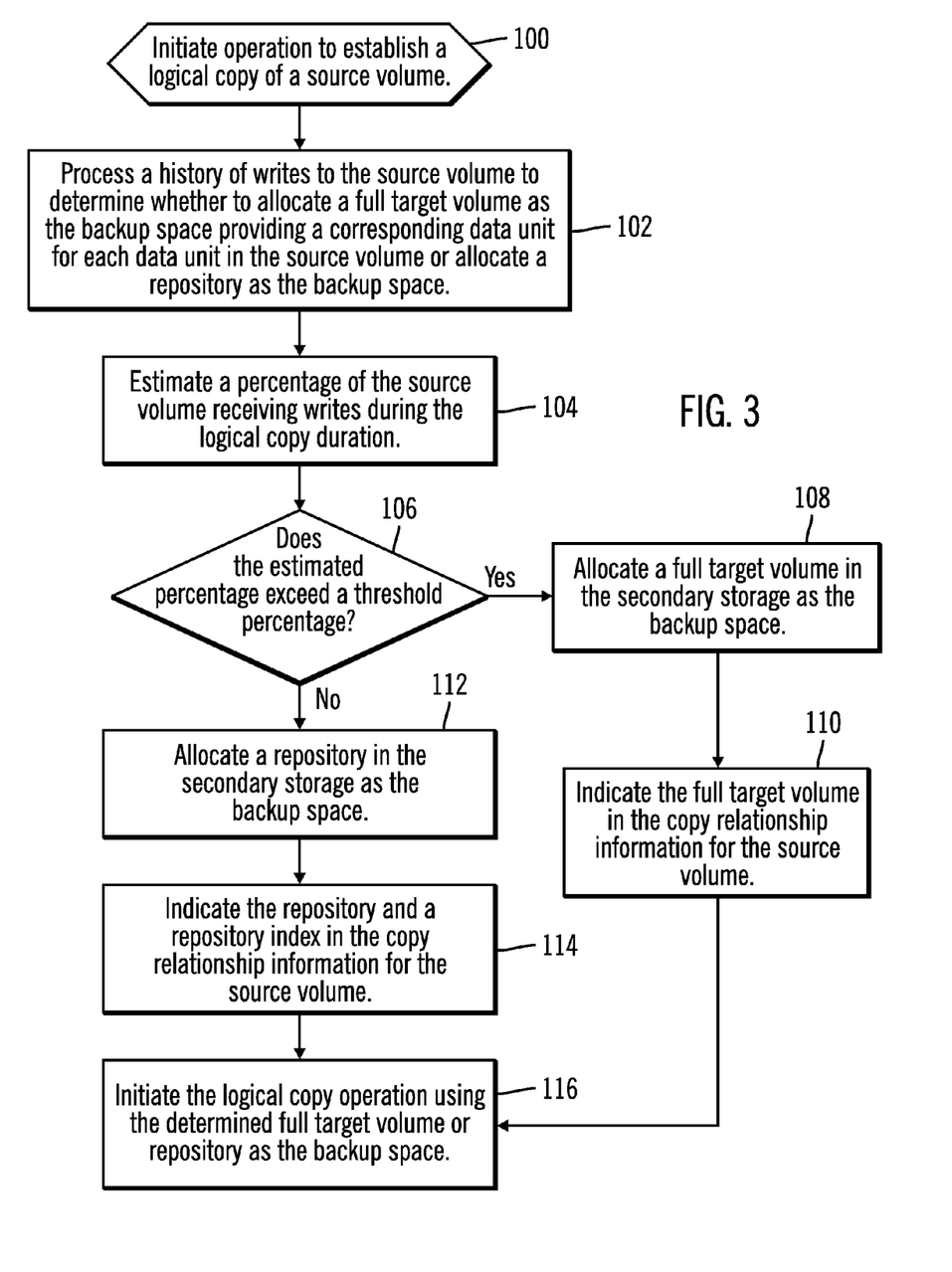
FIGS. 3, 5, and 6 illustrate embodiments of operations to establish a copy relationship and determine whether to use a full target volume or repository as the backup space.

FIG. 3 illustrates an embodiment of operations performed by the storage manager 10 to initiate a copy relationship and determine whether to use a full volume or repository as the target backup space. Upon initiating (at block 100) an operation to establish a logical copy of a source volume 6, the storage manager 10 processes (at block 102) the volume write history 28 information for the source volume 6 in the logical copy relationship to determine whether to allocate a full target volume 12 as the backup space providing a corresponding data unit for each data unit in the source volume or allocate a repository 14 as the backup space. The storage manager 10 estimates (at block 104) a percentage of the source volume 6 receiving writes during the logical copy duration. In one embodiment, the estimated percentage may comprise an estimated percentage of writes to unique locations in the source volume during the logical copy duration, not including subsequent writes to a same location in the source volume during the logical copy duration. For instance, the estimated percentage may be calculated by multiplying the first writes or updates per unit of time times the logical copy duration, and then divide this result by the total source volume 8. In one embodiment, the logical copy duration used in the estimated percentage calculation may comprise an estimated time to write the entire source volume 8 to a backup storage device, such as a tape drive, which may be based on the size of the source volume 8 and the write rate of the backup storage device.

If (at block 106) the estimated percentage exceeds a threshold percentage, then a full target volume 12 is allocated (at block 108) as the backup space for the copy relationship. The storage manager 10 indicates (at block 110) the full target volume 12 as the corresponding target volume 58 in the volume copy relationship information 50 for the source volume 6. If (at block 106) the estimated percentage does not exceed the threshold, then the storage manager 10 allocates (at block 112) a repository 14 in the secondary storage 16 as the backup space. In such case, the storage manager 10 indicates (at block 114) the repository 54 and a repository index 56 in the copy relationship 50 information for the source volume 6. After determining whether to allocate a full volume or repository as the backup space and establishing the logical copy with the determined backup space, the storage manager 10 may then initiate (at block 116) the logical copy operation using the determined backup space.

During the logical copy duration, point-in-time data in the source volume as of the time the logical copy operation was established is copied to corresponding locations in the target volume 12 or repository 14, depending on which is determined for the backup space, in response to an update to the point-in-time data. In this way, the backup space stores the data without the update.

With the described embodiment, if the percentage of the volume subject to updates that needs to be copied to the secondary storage 16 exceeds the threshold, then the use of a repository index 56 may have a negative effect on the efficiency of the copy operation that outweighs the benefit of saving space by avoiding allocating a full target volume. Although the full target volume uses more space in the secondary storage 16, less time is required with the full target volume technique to determine where to copy the point-in-time data to the source volume 6 because for a full target volume 12, the updated point-in-time data is copied directly to a corresponding target location. With the space efficient repository technique, management time is spent updating the repository index 56 to indicate where in the repository the point-in-time data is stored.

In a further embodiment, the copy relationship may comprise a group copy relationship including a plurality of source volumes 8 to copy to a secondary storage 16, where the source volumes 8 may be maintained in different primary storages 6 managed by different primary storage controllers 2, where the point-in-time data to the source volumes 8 subject to updates in a group managed by different primary storage controllers is transferred to secondary storage controllers 18 corresponding to the primary storage controllers maintaining the source volumes.

Figure 4:
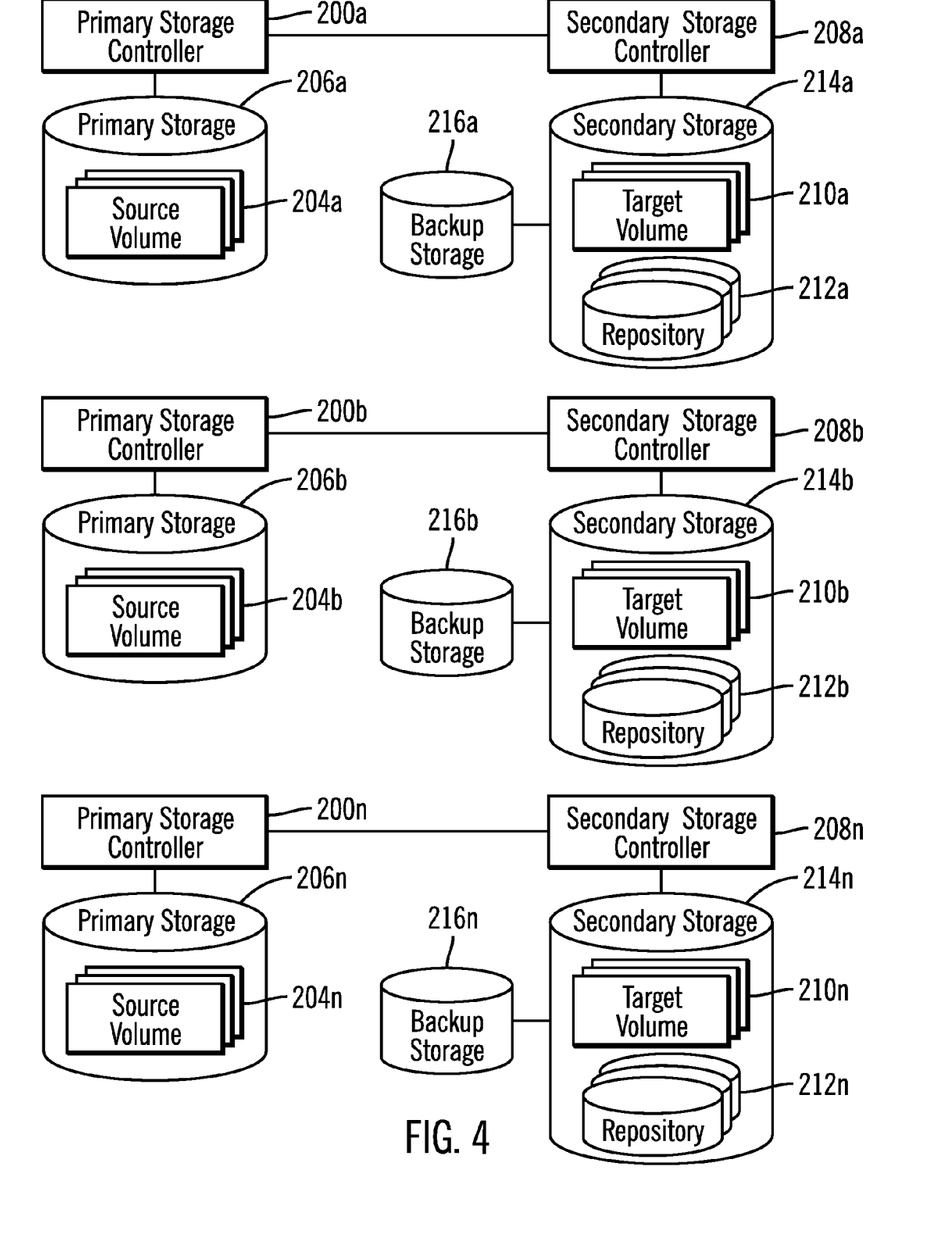

FIG. 4 illustrates an embodiment where a plurality of primary storage controllers 200a, 200b . . . 200n managing access to primary storages 202a, 202b . . . 202n copy point-in-time data in the source volumes 204a, 204b . . . 204n in primary storages 206a, 206b . . . 206n that are in a logical copy relationship to a corresponding secondary storage controller 208a, 208b . . . 208n to store in a determined target full volume 210a, 210b . . . 210n or repository 212a, 212b . . . 212n in a secondary storage 214a, 214b . . . 214n. The source volumes 204a, 204b . . . 204n may be in a same consistency group, such that all the data in the source volumes 204a, 204*b* . . . 204*n* is consistent as of a same point-in-time. The primary storage controllers 200*a*, 200*b* . . . 200*n* and secondary storage controllers 208*a*, 208*b* . . . 208*n* may comprise instances of the primary storage controller 2 of FIG. 1 and the secondary storage controllers 208*a*, 208*b* . . . 208*n* may comprise instances of the secondary storage controller 18 of FIG. 1, respectively. The logical copy in the target storage 214*a*, 214*b* . . . 214*n* and the repository 212*a*, 212*b* . . . 212*n* may be copied to a backup storage 216*a*, 216*b* . . . 216*n*, such as a tape drive. Although FIG. 4 shows one backup storage 216*ta*, 216*b* . . . 216*n* for each secondary storage 214*a*, 214*b* . . . 214*n*, in an alternative implementation there may be only one backup storage to store target volumes 210*a*, 210*b* . . . 210*n*, or a situation where multiple target volumes or secondary storages must share one backup storage.

Figure 5:
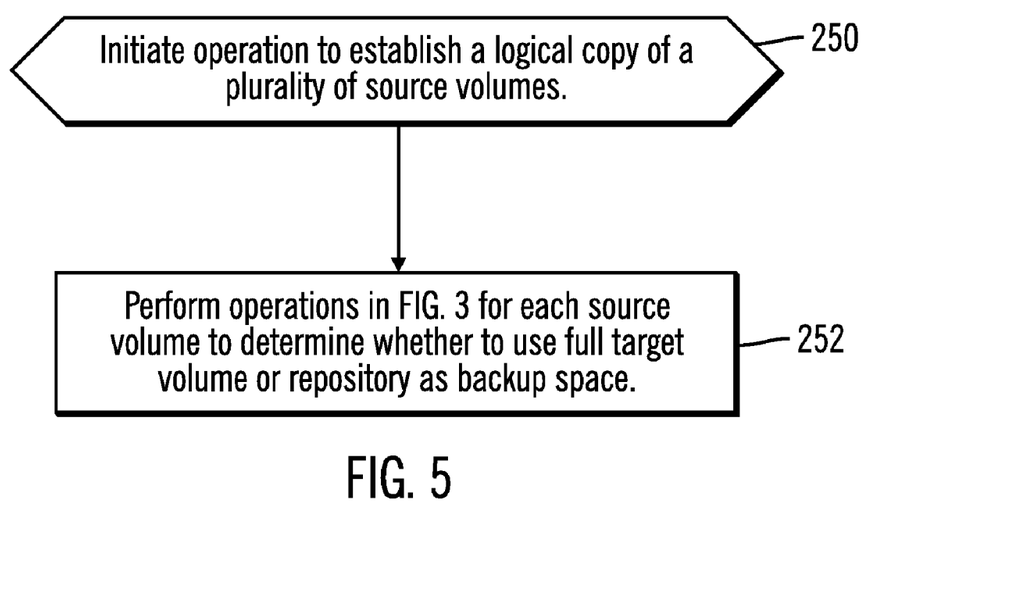

FIG. 5 illustrates an embodiment of operations performed by the storage managers 10 in the primary storage controllers 200*a*, 200*b* . . . 200*n* to manage a copy relationship comprising source volumes 204*a*, 204*b* . . . 204*n* managed by different primary storage controllers 200*a*, 200*b* . . . 200*n*. Upon initiating (at block 250) the operation to establish the logical copy relationship, the storage managers 10 in each primary storage controller 200*a*, 200*b* . . . 20*n* each perform (at block 252) the operations in FIG. 3 for each source volume to determine whether to use full target volume 210*a*, 210*b* . . . 210*n* or repository 212*a*, 212*b* . . . 212*n* as the backup space in the logical copy relationship 50 being established.

Figure 6:
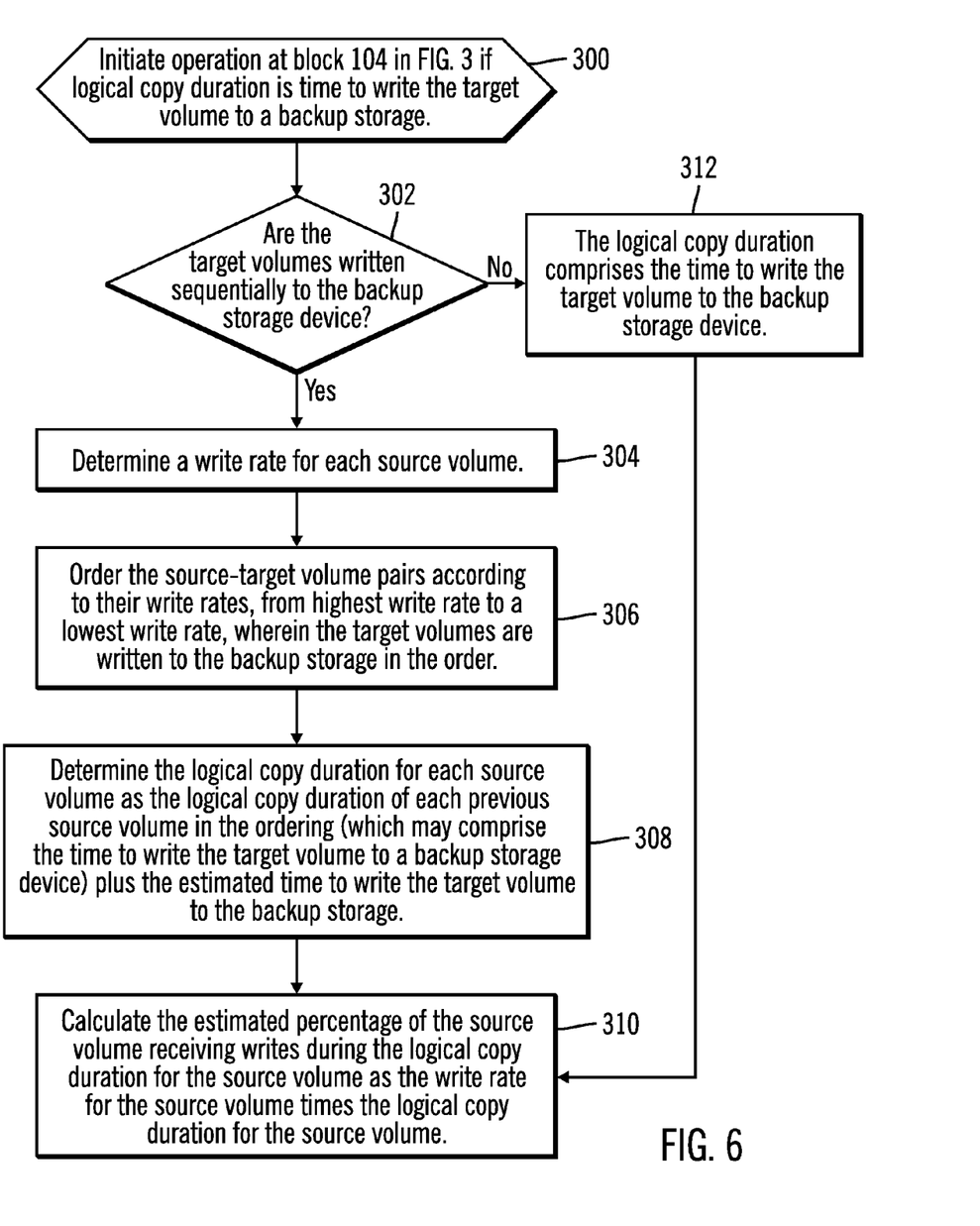

FIG. 6 illustrates a further embodiment of the operations at block 104 in FIG. 3 performed by each storage manager 10 in the primary storage controllers 200*a*, 200*b* . . . 200*ns* for each primary storage controller 200*a*, 200*b* . . . 200*n* to estimate the percentage of the source volume 204*a*, 204*b* . . . 204*n* receiving writes during the logical copy duration between a source-primary volume pairs. In an alternative embodiment, the operations of FIG. 6 may be performed by a manager component that coordinates and manages the copy relationships for the primary storage controllers 200*a*, 200*b* . . . 200*n*. In the embodiment of FIG. 6, the logical copy duration for each source volume 204*a*, 204*b* . . . 204*n* comprises the time to write each target volume 210*a*, 210*b* . . . 210*n* to a backup storage, such as a tape drive. Upon initiating (at block 300) the operation to determine the logical copy duration used to estimate the percentage of the source volume written during the logical copy duration, if (at block 302) the target volumes 210*a*, 210*b* . . . 210*n* are not written sequentially to the backup storage device, e.g., if there is one backup storage 216*a*, 216*b* . . . 216*n* for each target volume, then the logical copy duration for each source volume 204*a*, 204*b* . . . 204*n* comprises (at block 304) the time to write each source volume 204*a*, 204*b* . . . 204*n* to the backup storage device 216*a*, 216*b* . . . 216*n*.

If (at block 302) the target volumes 210*a*, 210*b* . . . 210*n* are written sequentially to the backup storage device, such as one backup storage device or tape drive, is used to backup data from multiple source volumes 204*a*, 204*b* . . . 204*n* in a group copy relationship, then the write rate for each source volume 204*a*, 204*b* . . . 204*n* is determined (at block 304). The write rate of the source volume is considered because it is the write rate at the source volume that determines the amount of data written to the target volume during a logical copy duration. Thus, the write rate to a source comprises the write rate for a source-target volume pair. The source volumes 204*a*, 204*b* . . . 204*n*, or source-target volume pairs, are ordered (at block 306) according to their write rates, from highest write rate to a lowest write rate. The target volumes are written to the backup storage in that determined order, or the order of the corresponding source volumes. The purpose of writing target volumes 214*a*, 214*b* . . . 214*n* according to the ordering of the write rate of their corresponding source volumes is to reduce the time that target volumes 214*a*, 214*b* . . . 214*n* having relatively higher write rates are exposed to receiving initial updates, as determined by the write rate to the corresponding source volume, that would require greater amounts of repository backup space. Thus, writing target volumes 214*a*, 214*b* . . . 214*n* according to their write rate ordering minimizes the repository backup space required for source volumes in a space efficient logical copy operation.

The storage manager 10 for all or each primary storage controller 200*a*, 200*b* . . . 200*n* then determines (at block 308) the logical copy duration for each source-target volume pair as the logical copy duration of each previous source volume in the ordering (which may comprise the time to write the target volume (for the source-volume pair) to a backup storage device plus the logical copy duration of the source volume being considered (e.g., estimated time to write the target volume for the source-volume being considered to the backup storage). The estimated percentage of the source volume 204*a*, 204*b* . . . 204*n* receiving writes during the logical copy duration for the source volume may be calculated (at block 310) as the write rate for the source volume times the logical copy duration for the source-target volume pair. This estimation is then used to determine whether the estimated percentage exceeds the threshold to determine whether a full volume is allocated to the source volume 204*a*, 204*b* . . . 204*n* or a repository at operations 106 et seq. in FIG. 3.

If (at block 302) the target volumes are not written sequentially to the backup storage device, then the logical copy duration comprises (at block 312) the time to write the target volume 210*a*, 210*b* . . . 210*n* to the backup storage device 216*a*, 216*b* . . . 216*n*.

In an alternative embodiment, before determining the logical copy duration of the source-target volume pairs, a determination is made of source volumes having an initial write rate that exceeds a write rate threshold. The volume copy relationship information 50 for these source volumes 204*a*, 204*b* . . . 204*n* is then configured to use a full volume backup for the backup space. The operations of 308-312 in FIG. 6 are then performed for the remaining source volumes not configured to use the full volume to use a repository. The write rate ordering is then determined and all target volumes are written to the backup storage their write rate.

In a yet further embodiment, the source volumes 204*a*, 204*b* . . . 204*n* may form a global consistency group that is copied over to the secondary storages 214*a*, 214*b* . . . 214*n* in a manner to maintain consistency across all the source volumes 204*a*, 204*b* . . . 204*n*. In such embodiments, the logical copy duration for each source-target volume pair in the global consistency group may comprise the duration during which writes to the source volumes 204*a*, 204*b* . . . 204*n* are suspended to create the logical copies of the source volumes 204*a*, 204*b* . . . 204*n* for a global consistency group. This constant logical copy duration may then be used in the embodiment of FIG. 6 to calculate the estimated percentage of each source volume 204*a*, 204*b* . . . 204*n* receiving initial writes during the logical copy operation.

Described embodiments provide techniques to use historical write data to one or more source volumes to determine whether to use a full target volume or a repository using less space than a full target volume as the backup space for the source volume in a logical copy relationship that only copies an initial update of data to the source volume to the backup space.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
establishing a logical copy relationship for a logical copy operation of a source volume in a primary storage to backup as of a point-in-time, wherein during a logical copy duration, hosts have access to the source volume;
maintaining a history of writes, in a computer readable storage medium, to the source volume indicating write activity to the source volume;
processing the history of writes to the source volume to determine whether to allocate for a backup space for the logical copy relationship a full target volume in a secondary storage as the backup space providing a corresponding data unit for each data unit in the source volume or allocate a repository in the secondary storage as the backup space, wherein the repository uses less storage space than the full target volume;
allocating the full target volume for the backup space in response to determining to allocate the full target volume;
allocating the repository for the backup space in response to determining to allocate the repository;
in response to allocating the full target volume, copying, during the logical copy duration, point-in-time data at the source volume to the full target volume as the backup space;

in response to allocating the repository, copying, during the logical copy duration, the point-in-time data at the source volume to the repository as the backup space; and copying, during the logical copy duration, point-in-time data in the source volume at the point-in-time subject to an update during the logical copy duration to the backup space in response to receiving the update.

2. The method of claim 1, wherein the copying during the logical copy operation of the point-in-time data subject to the update comprises:

during the logical copy duration copying the point-in-time data in the source volume subject to the update to corresponding locations in the target volume in response to allocating the full target volume; and during the logical copy duration copying the point-in-time data in the source volume subject to the update to the repository and updating a repository index to indicate locations in the repository of the point-in-time data copied from the source volume locations in response to allocating the repository.

3. The method of claim 1, wherein the processing of the history of writes to the source volume to determine whether to allocate the full target volume or the repository as the backup space comprises:

estimating a percentage of the source volume receiving writes during a previous logical copy duration of a previous logical copy operation; and determining whether the estimated percentage exceeds a threshold percentage, wherein the full target volume is allocated as the backup space in response to determining that the estimated percentage exceeds the threshold percentage and wherein the repository is allocated as the backup space in response to determining that the estimated percentage is less than the threshold percentage.

4. The method of claim 3, wherein the estimated percentage comprises an estimated percentage of writes to a unique location in the source volume during the logical copy duration, not subsequent writes to a same location in the source volume.

5. The method of claim 3, wherein the logical copy duration comprises an estimated time to write the target volume to a backup storage device.

6. The method of claim 1, wherein the determining of the source volume to backup using a logical copy operation comprises determining a plurality of source volumes to backup using logical copy operations, and wherein the operation of processing the history of writes to the source volume to determine whether to allocate the full target volume or the repository as the backup space is performed independently for each of the source volumes.

7. The method of claim 6, wherein the logical copy duration comprises for each source volume an estimated time to write the target volume to a backup storage device, wherein the logical copy duration for each source volume includes the logical copy duration of target volumes previously written to the backup storage device and a time to write the target volume to the backup storage device, wherein the operation of processing the history of writes to each source volume to determine whether to allocate the full target volume or the repository as the backup space is performed for each source volume and comprises performing for each source volume:

estimating a percentage of the source volume receiving writes during the logical copy duration for the source volume; and determining whether the estimated percentage exceeds a threshold percentage, wherein the full target volume is allocated as the backup space for the source volume in response to determining that the estimated percentage exceeds the threshold percentage and wherein the repository is allocated as the backup space in response to determining that the estimated percentage is less than the threshold percentage.

8. The method of claim 6, further comprising:

determining a write rate for each source volume;

ordering the source volumes according to their write rates, from highest write rate to a lowest write rate, wherein the target volumes are written to the backup storage device according to the ordering of their corresponding source volumes, wherein the ordering determines an estimated logical copy duration for each source volume, wherein the logical copy duration for each source volume comprises the estimated logical copy duration to write each previous target volume in the ordering of the corresponding source volumes to the backup storage device plus the logical copy duration to write the target volume being considered to the backup storage.

9. The method of claim 6, wherein the logical copy duration for each source volume comprises a time to create a consistency group across all the source volumes.

10. The method of claim 1, wherein the history of writes indicates write activity to the source volume during a previous logical copy operation prior to initiating the logical copy operation.

11. A system in communication with a source volume and a target volume, comprising:

a processor; and a computer readable storage media having code executed by the processor to perform operations, the operations comprising:

establishing a logical copy relationship for a logical copy operation of the source volume to backup as of a point-in-time, wherein during a logical copy duration, hosts have access to the source volume;

maintaining a history of writes, in the computer readable storage media, to the source volume indicating write activity to the source volume;

processing the history of writes to the source volume to determine whether to allocate for a backup space for the logical copy relationship a full target volume as the backup space providing a corresponding data unit for each data unit in the source volume or allocate a repository as the backup space, wherein the repository uses less storage space than the full target volume;

allocating the full target volume for the backup space in response to determining to allocate the full target volume;

allocating the repository for the backup space in response to determining to allocate the repository;

in response to allocating the full target volume, copying, during the logical copy duration, point-in-time data at the source volume to the full target volume as the backup space;

in response to allocating the repository, copying, during the logical copy duration, the point-in-time data at the source volume to the repository as the backup space; and copying, during the logical copy duration, point-in-time data in the source volume at the point-in-time subject to an update during the logical copy duration to the backup space in response to receiving the update.

12. The system of claim 11, wherein the copying during the logical copy operation of the point-in-time data subject to the update comprises:

during the logical copy duration copying the point-in-time data in the source volume subject to the update to corresponding locations in the target volume in response to allocating the full target volume; and during the logical copy duration copying the point-in-time data in the source volume subject to the update to the repository and updating a repository index to indicate locations in the repository of the point-in-time data copied from the source volume locations in response to allocating the repository.

13. The system of claim 11, wherein the processing of the history of writes to the source volume to determine whether to allocate the full target volume or the repository as the backup space comprises:

estimating a percentage of the source volume receiving writes during a previous logical copy duration of a previous logical copy operation; and determining whether the estimated percentage exceeds a threshold percentage, wherein the full target volume is allocated as the backup space in response to determining that the estimated percentage exceeds the threshold percentage and wherein the repository is allocated as the backup space in response to determining that the estimated percentage is less than the threshold percentage.

14. The system of claim 13, wherein the estimated percentage comprises an estimated percentage of writes to a unique location in the source volume during the logical copy duration, not subsequent writes to a same location in the source volume.

15. The system of claim 11, wherein the determining of the source volume to backup using a logical copy operation comprises determining a plurality of source volumes to backup using logical copy operations, and wherein the operation of processing the history of writes to the source volume to determine whether to allocate the full target volume or the repository as the backup space is performed independently for each of the source volumes.

16. The system of claim 15, wherein the logical copy duration comprises for each source volume an estimated time to write the target volume to a backup storage device, wherein the logical copy duration for each source volume includes the logical copy duration of target volumes previously written to the backup storage device and a time to write the target volume to the backup storage device, wherein the operation of processing the history of writes to each source volume to determine whether to allocate full target volume or the repository as the backup space is performed for each source volume and comprises performing for each source volume:

estimating a percentage of the source volume receiving writes during the logical copy duration for the source volume; and determining whether the estimated percentage exceeds a threshold percentage, wherein the full target volume is allocated as the backup space for the source volume in response to determining that the estimated percentage exceeds the threshold percentage and wherein the repository is allocated as the backup space in response to determining that the estimated percentage is less than the threshold percentage.

17. The system of claim 15, wherein the operations further comprise:

determining a write rate for each source volume; and ordering the source volumes according to their write rates, from highest write rate to a lowest write rate, wherein the target volumes are written to the backup storage device according to the ordering of their corresponding source volumes, wherein the ordering determines an estimated logical copy duration for each source volume, wherein the logical copy duration for each source volume comprises the estimated logical copy duration to write each previous target volume in the ordering of the corresponding source volumes to the backup storage device plus the logical copy duration to write the target volume being considered to the backup storage.

18. An article of manufacture comprising at least one of a computer readable storage medium having code and a hardware device having hardware logic executed to cause operations, the operations comprising:

establishing a logical copy relationship for a logical copy operation of a source volume to backup as of a point-in-time, wherein during a logical copy duration, hosts have access to the source volume point;

maintaining a history of writes to the source volume indicating write activity to the source volume;

processing the history of writes to the source volume to determine whether to allocate for a backup space for the logical copy relationship a full target volume as the backup space providing a corresponding data unit for each data unit in the source volume or allocate a repository as the backup space, wherein the repository uses less storage space than the full target volume;

allocating the full target volume for the backup space in response to determining to allocate the full target volume;

allocating the repository for the backup space in response to determining to allocate the repository;

in response to allocating the full target volume, copying, during the logical copy duration, point-in-time data at the source volume to the full target volume as the backup space;

in response to allocating the repository, copying, during the logical copy duration, the point-in-time data at the source volume to the repository as the backup space; and copying, during the logical copy duration, point-in-time data in the source volume at the point-in-time subject to an update during the logical copy duration to the backup space in response to receiving the update.

19. The article of manufacture of claim 18, wherein the copying during the logical copy operation of the point-in-time data subject to the update comprises:

during the logical copy duration copying the point-in-time data in the source volume subject to the update to corresponding locations in the target volume in response to allocating the full target volume; and during the logical copy duration copying the point-in-time data in the source volume subject to the update to the repository and updating a repository index to indicate locations in the repository of the point-in-time data copied from the source volume locations in response to allocating the repository.

20. The article of manufacture of claim 18, wherein the processing of the history of writes to the source volume to determine whether to allocate the full target volume or the repository as the backup space comprises:

estimating a percentage of the source volume receiving writes during a previous logical copy duration of a previous logical copy operation; and determining whether the estimated percentage exceeds a threshold percentage, wherein the full target volume is allocated as the backup space in response to determining that the estimated percentage exceeds the threshold percentage and wherein the repository is allocated as the backup space in response to determining that the estimated percentage is less than the threshold percentage.

21. The article of manufacture of claim 20, wherein the estimated percentage comprises an estimated percentage of writes to a unique location in the source volume during the logical copy duration, not subsequent writes to a same location in the source volume.

22. The article of manufacture of claim 20, wherein the logical copy duration comprises an estimated time to write the target volume to a backup storage device.

23. The article of manufacture of claim 18, wherein the determining of the source volume to backup using a logical copy operation comprises determining a plurality of source volumes to backup using logical copy operations, and wherein the operation of processing the history of writes to the source volume to determine whether to allocate the full target volume or the repository as the backup space is performed independently for each of the source volumes.

24. The article of manufacture of claim 23, wherein the logical copy duration comprises for each source volume an estimated time to write the target volume to a backup storage device, wherein the logical copy duration for each source volume includes the logical copy duration of target volumes previously written to the backup storage device and a time to write the target volume to the backup storage device, wherein the operation of processing the history of writes to each source volume to determine whether to allocate the full target volume or the repository as the backup space is performed for each source volume and comprises performing for each source volume:
 estimating a percentage of the source volume receiving writes during the logical copy duration for the source volume; and
 determining whether the estimated percentage exceeds a threshold percentage, wherein the full target volume is allocated as the backup space for the source volume in response to determining that the estimated percentage exceeds the threshold percentage and wherein the repository is allocated as the backup space in response to determining that the estimated percentage is less than the threshold percentage.

25. The article of manufacture of claim 23, further comprising:
 determining a write rate for each source volume;
 ordering the source volumes according to their write rates, from highest write rate to a lowest write rate, wherein the target volumes are written to the backup storage device according to the ordering of their corresponding source volumes, wherein the ordering determines an estimated logical copy duration for each source volume, wherein the logical copy duration for each source volume comprises the estimated logical copy duration to write each previous target volume in the ordering of the corresponding source volumes to the backup storage device plus the logical copy duration to write the target volume being considered to the backup storage.

26. The article of manufacture of claim 23, wherein the logical copy duration for each source volume comprises a time to create a consistency group across all the source volumes.

* * * * *